Aug. 27, 1968　　　　G. KIPER　　　　3,398,667
SHUTTER FOR PHOTOGRAPHIC CAMERAS
Filed Aug. 18, 1965
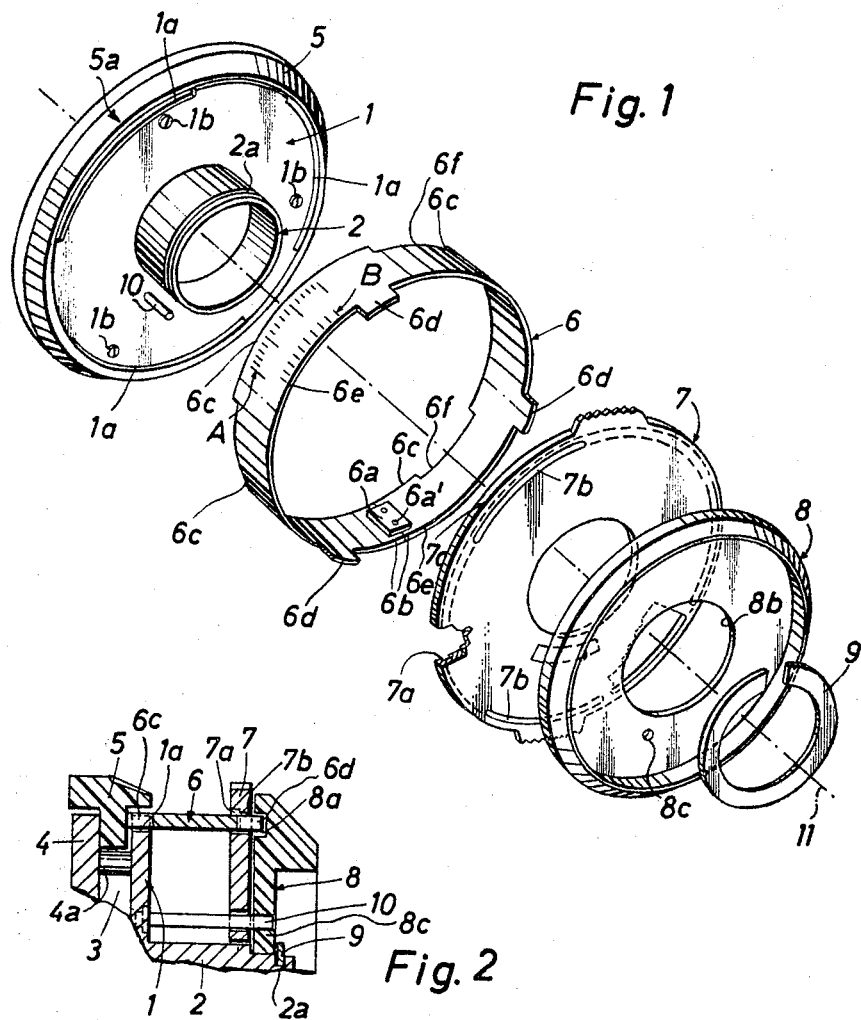
INVENTOR.
GERD KIPER
BY Michael J Striker

United States Patent Office 3,398,667
Patented Aug. 27, 1968

3,398,667
SHUTTER FOR PHOTOGRAPHIC CAMERAS
Gerd Kiper, Unterhaching, near Munich, Germany, assignor to Agfa-Gevaert Aktiengesellschaft, Leverkusen, Germany
Filed Aug. 18, 1965, Ser. No. 480,586
Claims priority, application Germany, Aug. 21, 1964,
A 46,910
14 Claims. (Cl. 95—53)

ABSTRACT OF THE DISCLOSURE

The shutter housing of a photographic camera comprises a main support having a mounting plate and a cylinder extending forwardly from the mounting plate, a cover located in front of the mounting plate and surrounding the cylinder, a split ring or a nut connecting the cover to the cylinder, and a cylindrical shell located between and fixed in position by the mounting plate and the cover. The shell surrounds the cylinder and has projections which extend into recesses provided in the mounting plate and/or cover. The shell consists of a strip of coiled sheet metal whose ends are riveted or otherwise connected to each other.

---

The present invention relates to photographic cameras in general, and more particularly to an improved shutter for use in such cameras. Still more particularly, the invention relates to a novel housing for shutters of photographic cameras.

In many types of photographic cameras, particularly in still cameras, the shutter, the objective and the diaphragm mechanism form a unitary assembly which is attached to the casing of the camera by means of screws, bayonet locks, male and female threads or the like. The housing of the shutter surrounds the movable components and includes a main support or rear wall which carries such movable components with sufficient clearance to allow for movement of diaphragm and shutter blades with reference to each other. The cylindrical portion or shell of the shutter housing is normally surrounded or is actually formed by one or more annular flanges forming part of rings which are manipulated to set the camera for manual or automatic operation, to select the size of the diaphragm opening, to select the exposure time, and/or to adjust the diaphragm or shutter mechanism in dependency on the light sensitivity of film in the supply cartridge.

It is an important object of the present invention to provide a very simple, lightweight, inexpensive and eye-pleasing composite shutter housing which may be assembled or taken apart with little loss in time, which can be assembled of very simple and inexpensive parts, and which is useful not only in cameras with automatic selection of exposure values but also in cameras wherein the various exposure values are selected by hand.

Another object of the invention is to provide a novel connection between the improved composite shutter housing and the elements which are used to select the size of the diaphragm opening and the exposure time.

A further object of the invention is to provide a very simple method of providing the shutter housing with graduated scales which indicate the size of the diaphragm opening and/or the exposure time.

An additional object of the instant invention is to provide a novel method of producing and assembling the components of a shutter housing and of assembling such components with the objective, with the casing of the camera, and with the members which are used to select various exposure values.

A concomitant object of the invention is to provide a very simple and inexpensive cylindrical shell or mantle which may be used in a shutter housing of the above outlined characteristics.

Still another object of the invention is to provide a method of producing a large number of blanks for transformation into cylindrical shells of shutter housings in a simultaneous operation and of providing such blanks with graduations indicating the exposure time and/or the size of the diaphragm opening.

Briefly stated, one feature of my invention resides in the provision of a shutter housing for photographic cameras which comprises a preferably flat, sheet- or plate-like main supporting member, a preferably washer-like metallic or plastic annular cover member located in front of and spaced from the main supporting member, and a cylindrical shell which constitutes a separately manufactured component of the shutter housing and is located between and is connected with the two members to form therewith a rigid unit.

Another feature of my invention resides in the provision of a method of mass-producing cylindrical components for use as shells in shutter housings for photographic cameras. The method comprises the steps of simultaneously imprinting on one side of a metallic sheet a plurality of scales each of which is provided with graduations indicating various exposure values (e.g., numerals which indicate various exposure times and/or various sizes of the diaphragm opening), removing from the metallic sheet a plurality of elongated strip-shaped blanks so that one side of each blank carries at least one scale, coiling each blank into the form of a cylinder wherein the end portions of the respective blank are adjacent to each other and wherein the scale or scales are located at the outside, and riveting or otherwise connecting the end portions of each blank to each other.

The novel features which are considered as characteristic of the invention are set forth in particular in the appended claims. The improved shutter housing itself, however, both as to its construction and the mode of assembling the same, together with additional features and advantages thereof, will be best understood upon perusal of the following detailed description of a specific embodiment with reference to the accompanying drawings, in which:

FIG. 1 is an exploded perspective view of certain components of a shutter whose housing is constructed and assembled in accordance with my invention; and FIG. 2 is a larger-scale fragmentary axial section through the fully assembled shutter.

Referring to the drawings in detail, there is shown a portion of a still camera which comprises a shutter including a housing assembled of three basic components, namely, a main support or main supporting member 1 which constitutes the rear wall of the shutter housing, a front wall or cover 8 which is located in front of and is spaced from the main support 1, and a cylindrical shell or mantle 6 which is located between the main support and cover and forms therewith a rigid unit. The main support 1 includes an annular mounting plate or washer provided with a forwardly projecting concentric extension or cylinder 2 which accommodates the objective, not shown. The mounting plate of the main support 1 also carries the movable parts of the shutter mechanism which are not shown in the drawings because their construction or operation forms no part of the present invention. The shutter blades and/or the diaphragm blades are accommodated in a space 3, shown in FIG. 2, which is located between the rear side of the main support 1 and the front side of a panel 4 constituting the front member or wall of the camera casing. A diaphragm setting member in the form of a plastic rotary element or ring 5 is mounted between the main support 1 and the panel 4 and is operatively connected with the diaphragm blades to facilitate selection of the exact size of the diaphragm opening. The connection between the main support 1 and the panel 4 comprises several screws 1b or similar fasteners which extend through suitable spacer sleeves 4a one of which is shown in FIG. 2. The ring 5 may also serve to adjust the diaphragm mechanism for "time" or "flash" operation. It will be noted that this ring is centered on the main support 1.

In accordance with an important feature of my present invention, the mantle or shell 6 does not form an integral part of the main support 1 but is produced and shaped in a separate step so as to constitute a distinct component of the shutter housing. In the illustrated embodiment, the shell 6 is obtained by stamping a suitable elongated strip-shaped blank from a flat sheet of metal and by thereupon coiling the blank to form a short cylinder whose end portions 6b are brought into abutment with each other and are held in such position by connecting means including a small plate 6a and rivets 6a'.

The shell 6 is formed with three angularly spaced forwardly extending projections or tongues 6d which extend beyond the front end face 6e thereof. Three additional projections or lugs 6c extend beyond the rear end face 6f of the shell 6. Still further, the external surface of the shell 6 is provided with two scales including a scale A whose graduations indicate various sizes of the diaphragm opening and which cooperates with an index 5a on the ring 5, and a scale B whose graduations indicate various exposure times and which cooperates with an index 7c provided on a speed selecting rotary element or ring 7. The scales A and B may be produced by an offset printing process prior to coiling of a stamped blank to form the shell 6. This results in substantial savings because simultaneous printing of such scales on a flat sheet of metal involves much less time and cost than the application of graduations to a cylindrical body.

The speed selecting ring 7 is operatively connected with the mechanism of the shutter to select the exposure time at the will of the user. The cover 8 is located in front of the ring 7 and has a central aperture 8b for the front end portion of the cylinder 2.

The main support 1 is formed with three arcuate recesses or cutouts 1a whose radii of curvature are located on the optical axis 11 and each of which receives without play one of the rear projections 6c on the shell 6. The length of the recesses 1a, as seen in the circumferential direction of the shell 6, corresponds to the length of the projections 6c so that, when these projections extend into the respective recesses, the shell is held against rotation with reference to and is concentric with the main support 1. The ring 7 has a rear face which is provided with a concentric groove 7a serving to receive the front end portion of the shell 6, i.e., that end portion which is immediately adjacent to the front end face 6e. The ring 7 is further provided with three arcuate slots 7b each of which may receive one of the front projections 6d. The length of the slots 7b exceeds considerably the length of the projections 6d so that, when these projections extend into the respective slots, the ring 7 is rotatable with reference to the shell 6 through such angles whose magnitude corresponds to the difference between the circumferential length of a slot 7b and the circumferential length of a projection 6d. The width of the groove 7a in the rear face of the ring 7 equals or exceeds only slightly the wall thickness of the shell 6 so that the ring 7 can prevent uncontrolled entry of light into the space within the shell 6 and is properly guided for angular movement about the axis 11. The difference between the length of the slots 7b and front projections 6d suffices to allow for selection of a desired exposure time when the ring 7 is rotated with reference to the shell 6.

The rear side of the cover 8 is provided with three recesses 8a (one shown in FIG. 2) which snugly receive the tips of the front projections 6d when the cover is fully assembled with the remaining parts of the shutter housing. Thus, the cover 8 cannot rotate with reference to the shell 6 and the latter cannot rotate with reference to the main support 1.

In assembling the camera, the operator proceeds as follows:

In the first step, the shutter blades and the diaphragm blades are installed in the space 3, and the main support 1 is attached to the panel 4 by means of the screws 1b. The ring 5 is held between the members 1 and 4 and is operatively connected with the remainder of the diaphragm mechanism. Its index 5a registers with one of the graduations on the scale A. In the next step, the shell 6 is assembled with the main support 1 by introducing the rear projections 6c into the respective recesses 1a. The shell 6 then forms an outer cylinder which is concentric with and spacedly surrounds the cylinder 2. In a further step, the ring 7 is assembled with the shell 6 in such a way that the front projections 6d extend through the respective slots 7b and that the ring 7 assumes a proper angular position with reference to the shell. The front end portion of the shell 6 (adjacent to the front end face 6e) then extends into the groove 7a in the rear side of the ring 7. It will be seen that the projections 6d center the ring 7 on the shell 6 and simultaneously allow for such angular displacements of this ring which are needed to select the desired exposure time. As stated hereinabove, the sealing action of the ring 7 suffices to prevent uncontrolled entry of light into the interior of the shell 6.

In the final step, the cover 8 is placed over the ring 7 in such a way that its aperture 8b receives the front end portion of the cylinder 2 whereby the tips of the front projections 6d extend into the corresponding recesses 8a in the rear side of the cover 8. In such position, the cover 8 is fixed to the cylinder 2 by means of a coupling including a split ring 9 which snaps into a peripheral groove 2a provided in the external surface of the cylinder 2. It is clear that the split ring 9 may be replaced by a different coupling; for example, the cylinder 2 may be provided with external threads and the ring 9 may be replaced by a nut which is brought into mesh with the cylinder 2 to hold the cover 8 in the position shown in FIG. 2. Alternatively, the cover 8 may be secured to the cylinder 2 by resorting to a suitable adhesive or by using coupling members in the form of screws. If the coupling between the cylinder 2 and cover 8 comprises one or more screws, the tips of such screws may extend into the groove 2a without any danger that the cover 8 would rotate because such rotation is prevented by the projections 6d which fit snugly into the corresponding recesses 8a.

The projections 6c, 6d extend into the respective recesses 1a and slots 7b with a minimum of lateral play so that the shell 6 and the parts 7, 8 are accurately centered on the main support 1 even though the shell 6 need not be positively secured to the member 1 and/or 8. This results in substantial savings in time and material and insures a more accurate sealing action because light would be likely to penetrate through bores for screws or similar fasteners which are normally utilized to connect all separable components of a shutter housing to each other.

FIG. 2 illustrates a rotation preventing bolt or stud 10 which is anchored in the main support 1 and whose front end portion extends into a bore 8c provided in the cover 8 to hold the latter against rotation. The rear end of the bolt 10 may resemble a rivet head and is fixed to the main support 1.

The members 1, 4 and 8 may be stamped from flat sheets of metallic material or each thereof may be made of synthetic thermoplastic material by resorting to an injection molding or other suitable process. Each of these members may be provided with decorative grooves, ribs or other eye-pleasing formations to enhance the appearance of the shutter. In the illustrated embodiment, the cover 8 consists of synthetic plastic material.

It is clear that the improved shutter is susceptible of many modifications without departing from the spirit of my invention. Thus, the cylinder 2 may be made integral with the main support 1 or it may be produced in a separate step and is then screwed or otherwise connected to the member 1. Furthermore, the diaphragm ring 5 could be mounted in front of the main support 1 in the same way as the speed selecting ring 7, i.e., the ring 5 could be provided with arcuate slots of such length that each such slot would receive one of the rear projections 6c with a play sufficing to allow for angular displacements of the ring 5 with reference to the shell 6. It is further clear that, instead of coiling a stamped-out strip-shaped blank into the shape of the shell 6, the latter may be produced in a turning lathe or in another suitable machine tool by removing material from a relatively large slug or by suitable shaping of a tubular blank. Finally, it is equally clear that the thin-walled projections 6c, 6d on the shell 6 may be replaced by screws, pins or otherwise configurated elongated cylindrical or rod-shaped bodies as long as such bodies allow for requisite angular displacements of the rings 5 and 7.

If the shell 6 is formed by stamping strip-shaped blanks from a metallic sheet, one side of the sheet is preferably imprinted to form the scales A and/or B by resorting to an offset printing or other suitable process. Several such scales may be applied in a simultaneous operation and each strip-shaped blank carries at least one scale which is located at the outside when the respective blank is coiled to form a cylinder. Such mass-producing operation results in substantial savings, particularly as regards the application of scales.

Without furher analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the following claims.

What is claimed as new and desired to be protected by Letters Patent is:

1. In a photographic camera, a shutter housing comprising a main support including a mounting plate; a cover located in front of and spaced from said support; connecting means directly securing said cover member to said supporting member; and a cylindrical shell being independent of said connecting means and constituting a separate component of said housing and positioned intermediate the mounting plate of said support and said cover, said shell being fixed in such position by said mounting plate and said cover.

2. In a photographic camera, a shutter housing comprising a main support including a mounting plate; a cover located in front of and spaced from said support; first connecting means directly securing said cover to said support; and a cylindrical shell being independent of said connecting means and constituting a separate component of said housing and positioned intermediate the mounting plate of said support and said cover, said shell being fixed in such position by said mounting plate and said cover and said shell comprising a length of sheet metal having abutting end portions and second connecting means securing said end portions to each other.

3. A shutter housing as set forth in claim 2, wherein said second connecting means comprises at least one rivet.

4. In a photographic camera, a shutter housing comprising a main support including a mounting plate; a cover located in front of and spaced from said support; connecting means directly securing said cover member to said supporting member; and a cylindrical shell being independent of said connecting means and constituting a separate component of said housing and positioned intermediate the mounting plate of said support and said cover, said shell being fixed in such position by said mounting plate and said cover and said shell having an external surface provided with at least one scale.

5. A shutter housing as set forth in claim 4, wherein said scale comprises a set of graduations which are imprinted onto said external surface.

6. In a photographic camera, a shutter housing comprising a main supporting member including a mounting plate; a cover member located in front of and spaced from said supporting member; connecting means directly securing said cover member to said supporting member; a cylindrical shell constituting a separate component of said housing and positioned intermediate said mounting plate and said cover member, said shell having an annular end face and one of said members having a recess; and means for fixing said shell in position between said mounting plate and said cover member, including a projection provided on said end face and extending into said recess.

7. In a photographic camera, a shutter housing comprising a main supporting member including a mounting plate; a cover member located in front of and spaced from said supporting member; connecting means directly securing said cover member to said supporting member; a cylindrical shell being independent of said connecting means and constituting a separate component of said housing and positioned intermediate said mounting plate and said cover member, said shell having two annular end faces each adjacent to one of said members and said members having recesses; and means for fixing said shell in position between said mounting plate and said cover member, including at least one projection provided on each of said end faces and extending into the recess of the respective member.

8. In a photographic camera, a shutter housing comprising a main support including a mounting plate provided with a centrally located forwardly projecting extension; a cover located in front of and spaced from said support; connecting means directly securing said cover to said extension; and a cylindrical shell independent of said connecting means and constituting a separate component of said housing and positioned intermediate the mounting plate of said support and said cover, said shell being fixed in such position by said mounting plate and said cover.

9. In a photographic camera, a shutter housing comprising a main support including a substantially plate-like circular mounting member having a centrally located forwardly projecting cylinder; an annular cover member located in front of and spaced from said support; coupling means concentrically securing said cover member to said cylinder; a cylindrical shell outwardly spaced from said cylinder and said coupling means and constituting a separate component of said housing and positioned intermediate said members, said shell being coaxial with and spacedly surrounding said cylinder and having two end faces; and means fixing said shell in position between said members, including at least one projection provided on at least one of said end faces and extending into a recess of the respective member.

10. A shutter housing as set forth in claim 9, wherein said coupling means comprises a split ring located in front of said cover member and extending into a peripheral groove of said cylinder.

11. A shutter housing as set forth in claim 9, wherein said cylinder is provided with external threads and said coupling means comprises a nut located in front of said cover member and meshing with said cylinder.

12. In a photographic camera, a shutter housing comprising a main supporting member including a mounting plate; a cover member located in front of and spaced from said supporting member; connecting means directly securing said cover member to said supporting member; a cylindrical shell being independent of said connecting means and constituting a separate component of said housing and positioned intermediate said members, said shell having an annular end face provided with at least one projection and one of said members having a recess receiving said projection to fix the shell in position between said members; and a rotary shutter adjusting element disposed between said shell and said one member, said rotary element having an arcuate slot receiving said projection and being long enough to allow for angular displacement of said rotary element with reference to said shell.

13. A shutter housing as set forth in claim 12, wherein the center of curvature of said slot is located on the axis of said shell and wherein said rotary element is disposed between said shell and said cover member.

14. A shutter housing as set forth in claim 12, wherein said rotary element is provided with a concentric groove which receives the end face of said shell.

References Cited
UNITED STATES PATENTS

| | | | |
|---|---|---|---|
| 2,112,653 | 3/1938 | McLeman | 29—252 |
| 3,276,343 | 10/1966 | Spiessl | 95—53 |
| 371,352 | 10/1887 | Pedersen | 95—45 |
| 382,858 | 5/1888 | Bausch | 95—63 |
| 2,472,586 | 6/1949 | Harvey | 95—53 |
| 2,987,978 | 6/1961 | Gebele | 95—53 |

JOHN M. HORAN, *Primary Examiner.*